(12) United States Patent
Beuerle et al.

(10) Patent No.: US 9,227,357 B2
(45) Date of Patent: Jan. 5, 2016

(54) METHOD OF FORMING A CONTAINER

(75) Inventors: Frederick C. Beuerle, Jackson, MI (US); G. David Lisch, Jackson, MI (US); Kirk Edward Maki, Tecumseh, MI (US); Bradley Wilson, Manchester, MI (US); Reinhard C. J. Luchies, Ann Arbor, MI (US)

(73) Assignee: Amcor Limited, Hawthorn (AU)

( * ) Notice: Subject to any disclaimer, the term of this patent is extended or adjusted under 35 U.S.C. 154(b) by 734 days.

(21) Appl. No.: 13/432,217

(22) Filed: Mar. 28, 2012

(65) Prior Publication Data

US 2012/0248660 A1    Oct. 4, 2012

Related U.S. Application Data

(60) Provisional application No. 61/468,748, filed on Mar. 29, 2011.

(51) Int. Cl.
*B29C 49/64* (2006.01)
*B29C 49/12* (2006.01)
*B29C 49/18* (2006.01)
*B29C 49/16* (2006.01)

(52) U.S. Cl.
CPC .............. *B29C 49/649* (2013.01); *B29C 49/12* (2013.01); *B29C 49/185* (2013.01); *B29C 49/16* (2013.01); *B29C 49/6409* (2013.01); *B29C 49/6472* (2013.01); *B29C 49/6481* (2013.01); *B29C 2049/1219* (2013.01); *B29C 2049/1228* (2013.01); *B29C 2791/006* (2013.01); *B29C 2793/009* (2013.01)

(58) Field of Classification Search
CPC ........ B29C 49/08; B29C 49/12; B29C 49/16; B29C 49/18; B29C 49/185; B29C 49/6409; B29C 49/6472; B29C 49/6481; B29C 49/649; B29C 2049/1219; B29C 2049/1228; B29C 2791/006; B29C 2793/009
See application file for complete search history.

(56) References Cited

U.S. PATENT DOCUMENTS 4,318,882 A * 3/1982 Agrawal et al. ................ 264/521
4,327,052 A    4/1982 Sauer
5,352,402 A   10/1994 Orimoto et al.
(Continued)

FOREIGN PATENT DOCUMENTS

JP    2006-117289    5/2006
WO   WO 2010-070846   6/2010

OTHER PUBLICATIONS

International Search Report and Written Opinion dated Oct. 24, 2012 from corresponding PCT International Patent Application No. PCT/US2012/030864 (nine pages).

*Primary Examiner* — Yogendra Gupta
*Assistant Examiner* — Hannuri L Kwon
(74) *Attorney, Agent, or Firm* — Harness, Dickey & Pierce, PLC

(57) ABSTRACT

An apparatus and method for forming a plastic container is provided. The method includes disposing a preform into a primary mold cavity and applying pressurized air to urge the preform to conform to the shape of the primary mold cavity to form a primary article. The primary article is then permitted to shrink to a predetermined volume. The method can further include exposing the primary article to an internal vacuum to facilitate shrinking to a predetermined volume. The method further includes disposing the primary article into a second mold cavity and applying pressurized air to urge the primary article to conform to the second mold cavity to form an intermediate article. Finally, at least a portion of the intermediate article is trimmed off to form a final container.

35 Claims, 4 Drawing Sheets

(56) References Cited

U.S. PATENT DOCUMENTS 5,474,735 A * 12/1995 Krishnakumar et al. ..... 264/529
2002/0048642 A1 * 4/2002 Beck .................... 428/35.7
2005/0140036 A1 * 6/2005 Hirota et al. ............ 264/40.1
2007/0175854 A1 * 8/2007 Penny .................... 215/383

* cited by examiner

METHOD OF FORMING A CONTAINER

CROSS-REFERENCE TO RELATED APPLICATIONS

This application claims the benefit of U.S. Provisional Application No. 61/468,748, filed on Mar. 29, 2011. The entire disclosure of the above application is incorporated herein by reference.

FIELD

This disclosure generally relates to a system and method for forming a plastic container. More specifically, this disclosure relates to a system and method for double blow molding a plastic container.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc). Once a container has been blown, a commodity may be filled into the container.

Traditionally, stretch blow molding has been used to manufacture resultant containers using a preform. The preform is heated and pressurized gas or fluid is introduced therein to stretch the preform to closely conform to the shape of a mold device. In some applications, the resultant container may shrink due to various mechanical and composition properties of the material being used. In some applications, the mold device can be sized larger than a desired final container size to permit shrinkage of the container into its final shape.

In some cases, containers can be manufactured using a double-blow process. The double-blow process can includes a step where a preform is blown into what is known as a primary article. This primary article is blown in a hot mold and is of similar size, or somewhat larger, than the finished container. In one method, this primary article is then moved through a series of ovens to shrink it to a point smaller than the finished container. In another method, the primary article is removed from the hot mold and allowed to shrink on its own to a point smaller than the actual container. The primary article is then moved into the final blow mold and blown into the finished container. However, according to these processes, the time necessary to either heat the primary article to encourage shrink or the time necessary for the primary article to shrink to a smaller size for final blow molding can delay the overall time of manufacture, thereby reducing the throughput of the manufacturing system. Therefore, there is a need to overcome these disadvantages.

SUMMARY

This section provides a general summary of the disclosure, and is not a comprehensive disclosure of its full scope or all of its features.

Accordingly, the present disclosure provides a system and method for inducing shrinkage in a primary article or preshape using vacuum.

In one example, a mold cavity defines an internal surface and is adapted to accept a preform. A pressure source outputs a pressurized fluid and a vacuum source provides vacuum. A blow nozzle is fluidly coupled to the pressure source and the vacuum source and adapted to receive the pressurized fluid from the pressure source and transfer the pressurized fluid into the preform thereby urging the preform to expand toward the internal surface of the mold cavity. The blow nozzle is further adapted to selectively establish a vacuum within the preform to urge the preform to constrict from the internal surface of the mold cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
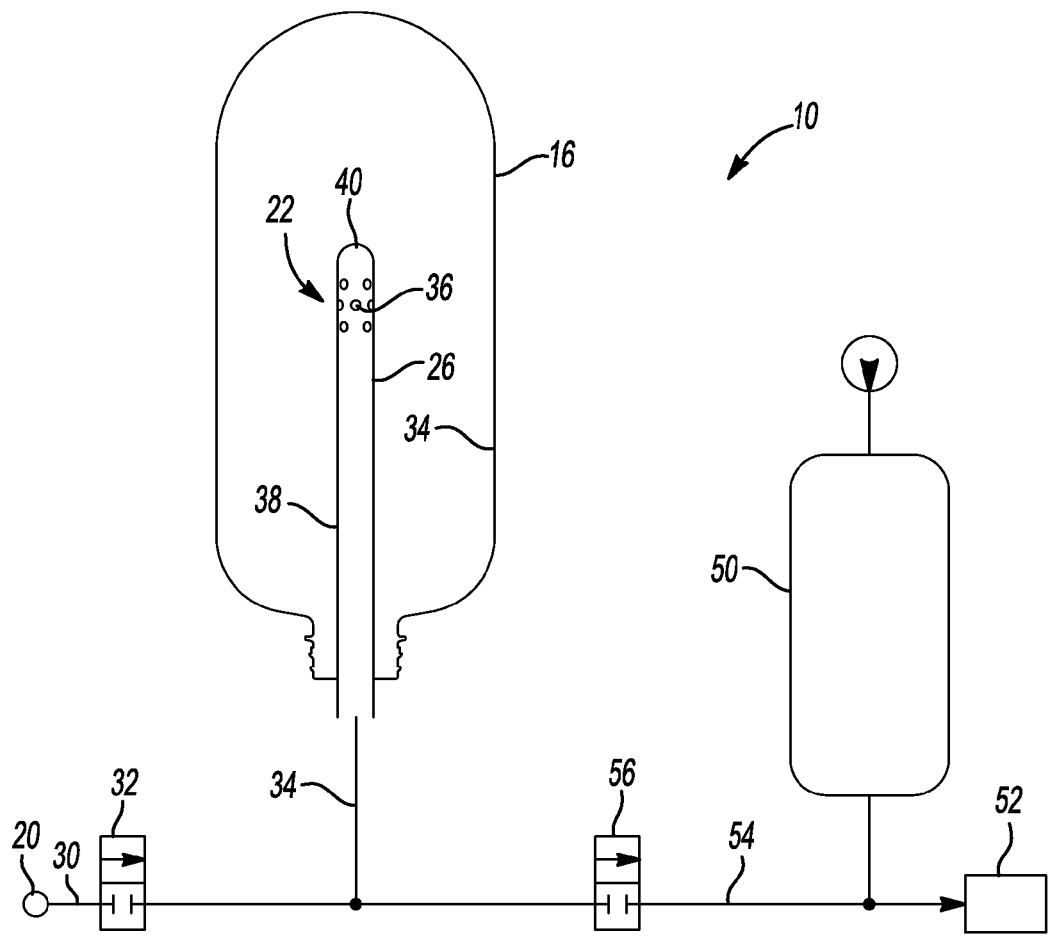
FIG. 1 is a schematic depiction of a mold station having a pressure source and a vacuum source according to some embodiments of the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a method is provided that provides a means of inducing shrinkage within a primary article using vacuum to reduce the primary container size. Generally, the act of over-blowing a preform into a primary article can increase the orientation and crystallinity of a final container. The act of forcing the primary article into a smaller form is necessary to improve cycle time and reduce in-mold time. It is believed that the primary article needs to be similar in size or larger than the finished container in order to create relaxation in the material prior to final forming in the second stage. What was not previously known is if this relaxation can be forced by means of a vacuum force being created within the primary article.

In some embodiments, the present teachings apply a vacuum force, either by means of a vacuum pump or venturi, to force the primary article, after being blown into its shape, into a shape smaller than the finished container. In some embodiments, vacuum can be obtained using a positive displacement pump, a momentum transfer pump (molecular pump), entrapment pump, and/or Venturi pump (aspirator). By way of non-limiting example, a positive displacement pump, such as a rotary vane pump, diaphragm pump, liquid ring pump, piston pump, scroll pump, screw pump, Wankel pump, external vane pump, roots blower (booster pump), multistage roots pump, Toepler pump, and/or lobe pump, can be used. Similarly, by way of non-limiting example, a momentum transfer pumps can employ high speed jets of dense fluid or high speed rotating blades to knock gas molecules out of the chamber, and can include diffusion pumps or turbomolecular pump. Counter Stretch Rods (CSR) can then be used to guide the preform into the proper position on the base and can be further used to encourage the proper shrinking of the primary article.

Briefly, according to some embodiments of the present teachings, after a preform is heated, it can be placed in a primary article mold (or a mold where the shape is similar or larger than that of the finished container). A stretch rod can mechanically push the preform to induce orientation then pressurized air (anywhere from 60 to 600 PSI) can be introduced through the stretch rod/blow nozzle assembly to form the pre-shape. In some embodiments, the stretch rod/blow nozzle assembly will stop short of the full height of the pre-shape and a counter stretch rod can be used to guide the preform to maintain a centered gate.

Pressurized air can be used to expand the pre-shape out to the heated cavity walls. In some embodiments, hot air can be introduced into the pre-shape to increase thermal properties of the material. The internal pressure can then be released either to atmosphere or into an air recovery system. At this point, the hot pre-shape will start to shrink away from the cavity walls. At this same time, a vacuum can be introduced to aid in the evacuation of internal air. The external counter stretch rod can be used to maintain gate center and to aid in the reduction of the overall height. Pressurized hot air can be introduced into the final article to aid in the relaxation and to develop further crystallinity in the material. This pressurized hot air can also aid in the container definition, more specifically a blown finish where standard pressurized air has an insufficient temperature to soften the material enough to form the threads to their specified dimension.

With reference to all figures, a mold station according to the present teachings is shown and generally referred to as reference numeral 10. FIGS. 2A-2D show one exemplary sequence according to the present teachings. As will become appreciated from the following description, the mold station 10 and associated method utilize a double blow methodology to shape a preform to a final container configuration using a pressurized fluid, such as gas or liquid, to initiate a first expansion, then a vacuum or reduced pressure to initiate the shrinkage, and optionally additional shaping of the final container.

With initial reference to FIG. 1, the mold station 10 will be described in greater detail. The mold station 10 generally includes a mold cavity 16, a pressure source 20 and a blow nozzle 22. In some embodiments, blow nozzle 22 can be integrally formed with or as a stretch rod 26, as illustrated and described herein. The exemplary mold cavity 16 can comprise two or more mold halves or sections that cooperate to define an interior surface 34 corresponding to at least an initially-desired outer profile of a blown container. The mold cavity 16 may be moveable from an open position to a closed position such that a support ring of a preform 12 (FIG. 2A-2B) is captured at an exposed end of the mold cavity 16. The preform 12 may be formed of a polyester material, such as polyethylene terephthalate (PET), having a shape well known to those skilled in the art similar to a test-tube with a generally cylindrical cross section and a length typically approximately fifty percent (50%) that of the resultant container height. The support ring may be used to carry or orient the preform 12 through and at various stages of manufacture. For example, the preform 12 may be carried by the support ring, the support ring may be used to aid in positioning the preform 12 in the mold cavity 16, or an end consumer may use the support ring to carry the plastic container once manufactured.

Alternatively, other conventional materials including, for example, thermoplastic, high density polyethylene, polypropylene, polyethylene naphthalate (PEN), a PET/PEN blend or copolymer, ABS, PVC, PP, PET, PETG, HDPE, LDPE, PC, COC, COP, EVOH, PLA, PBT, PEN, PGA, Polyesters (PET, PLA, PGA, PBT, PEN) PGA PLA>PET>PBT, PEN, Polyamides (PA-6, PA-6,6, PA-MXD6), Polyolefin (PP, PE, COC/COP) and various multilayer structures or other structures, may be suitable for the manufacture of the plastic container and used in connection with the principles of the present teachings.

In one example, the pressure source 20 can be in the form of, but not limited to, a filling cylinder, manifold, chamber, or air supply that can comprise a mechanical piston-like device such as, but not limited to, a piston, a pump (such as a hydraulic pump) or any other such similarly suitable device. The pressure source 20 has an outlet 30 for delivering the fluid (gas or liquid) to the blow nozzle 22. In some embodiments, a fluid supply valve 32 can be dispose in the line from outlet 30 that is positionable between at least an opened position providing pressurized fluid to blow nozzle 22 and a closed position.

Figure 3:
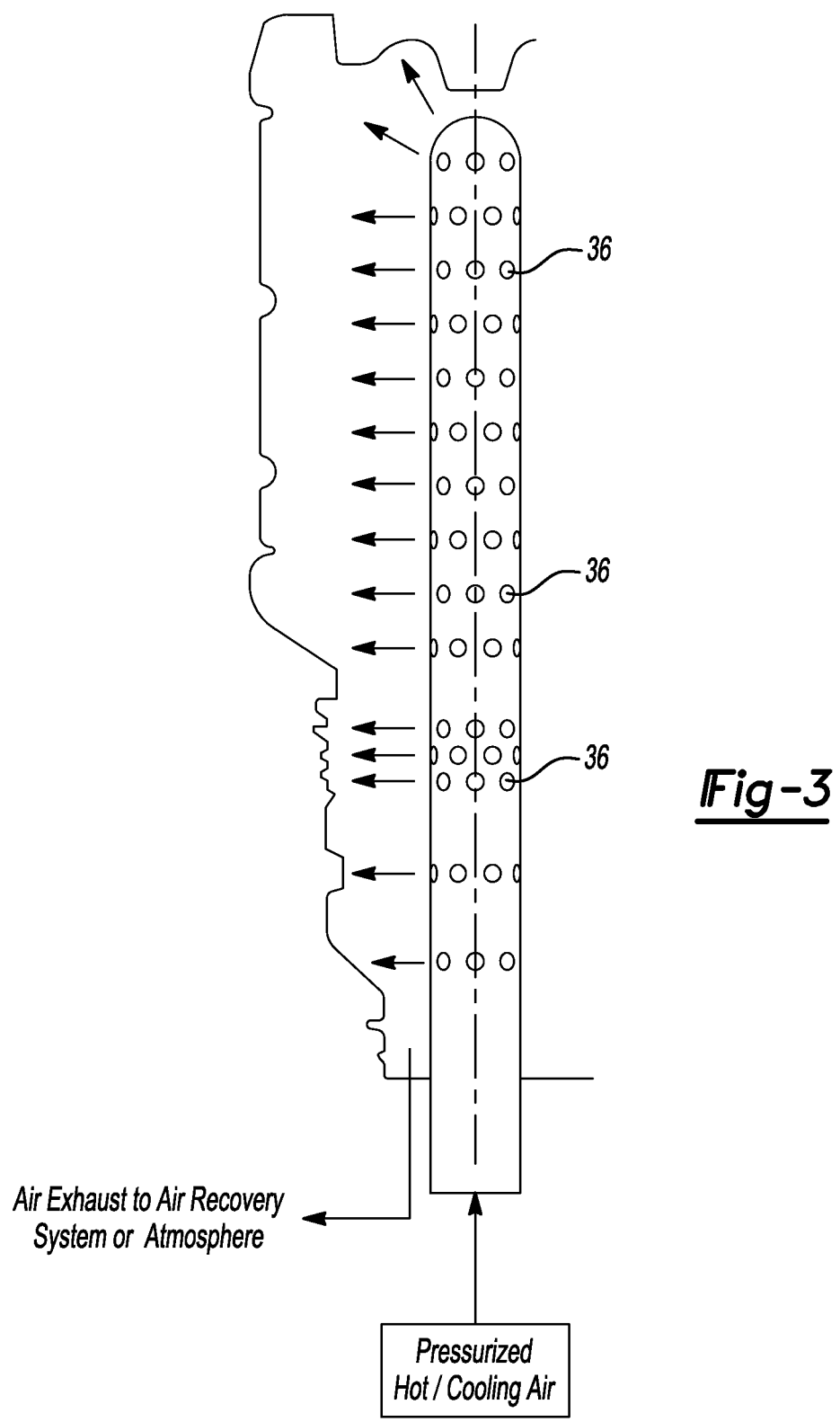
FIG. 3 is a schematic depiction of the system illustrated in FIG. 1 wherein pressurized hot air/cooling air is introduced into the article to define a final container shape.

The blow nozzle 22 generally defines an inlet 34 for accepting the pressurized fluid from the outlet 30 of the pressure source 20 and an outlet 36 for delivering the pressurized fluid into the preform 12. The blow nozzle 22 can further define a fluid passage there within in fluid communication with inlet 34 and outlet 36. It is appreciated that the outlet 36 may define a shape complementary to the preform 12 near the support ring such that the blow nozzle 22 may easily mate with the preform 12 during the forming process. Moreover, in some embodiments, blow nozzle 22 can comprise a plurality of ports 36 (see FIG. 3). In this way, ports 36 can define one or more ports extending along a side wall 38 and/or tip 40 for introducing the pressurized fluid into the preform 12. It should be appreciated that ports 36 can be uniformly disposed along blow nozzle 22 and/or can be disposed at discrete locations for improved heating and/or cooling of preform 112, the primary article, and/or the final container. This can be used to tailor specific crystallinity and/or other properties of the container.

With continued reference to FIG. 1, in some embodiments, mold station 10 can further comprise a vacuum source 50. The vacuum source 50 can be in the form of, but not limited to, a cylinder, manifold, chamber, or source having a pressure less than the pressure source 20. In some embodiments, vacuum source 50 can be used to provide a vacuum, that is a pressure less than pressure source 20 and, in some embodiments, can be used to provide a pressure at or less than ambient pressure. In some embodiments, vacuum source 50 comprises a vacuum pump or Venturi 52 for creating or accumulating a vacuum in vacuum source 50. It should be understood that although vacuum source 50 is illustrated as tank that can accumulate a vacuum created by vacuum pump or Venturi 52, the vacuum source 50 can merely include a pump, Venturi or other means for providing a vacuum without the need for tank structure or the like. The vacuum source 50 has a line 54 for communicating a vacuum or reduced pressure to the blow nozzle 22. In some embodiments, a vacuum supply valve 56 can be dispose in the line 54 that is positionable between at least an opened position drawing a vacuum at blow nozzle 22 and a closed position. In this way, the vacuum source 50 can be used for introducing a vacuum within the primary article to encourage shrinkage of the article at a predetermined rate. This shrinkage can be used to set the container into a final shape (i.e. smaller than the mold 16) having a predetermined micro-structure (i.e. lower energy state) and/or used to initiate a relaxation of the container structure prior to introduction of additional pressurized fluid from pressure source 20 to define the final container configuration, which will retain the low energy state.

In some embodiments, mold station 10 can further comprise a counter stretch rod 60 (FIGS. 2A-2D) engagable with preform, the pre-shape, primary article, or other stages of the container during molding. Counter stretch rod 60 comprises a distal tip 62 that contacts and supports the preform, pre-shape, primary article, or the like.

With reference now to all figures, an exemplary method of forming a plastic container will be described. At the outset, the preform 12 may be placed into the mold cavity 16. In one example, a machine (not illustrated) places the preform 12 heated to a temperature between approximately 190° F. to 250° F. (approximately 88° C. to 121° C.) into the mold cavity 16. As the preform 12 is located into the mold cavity 16, the mold cavity 16 may then close thereby capturing the preform 12. The blow nozzle 22 may form a seal at a finish of the preform 12. The mold cavity 16 may be heated to a temperature between approximately 200° F. to 400° F. (approximately 93° C. to 204° C.) in order to impart increased crystallinity levels within the resultant container. In another example, the mold cavity 16 may be provided at ambient or cold temperatures between approximately 32° F. to 90° F. (approximately 0° C. to 32° C.).

Figure 2D:
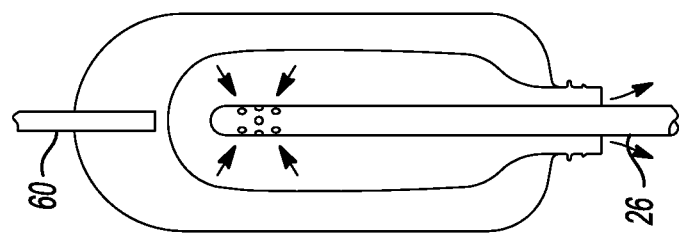
FIG. 2D is a schematic depiction of the system illustrated in FIG. 1 wherein a vacuum is created within the preform by the vacuum source thereby causing the preform to be urged to a smaller size.
Figure 2C:
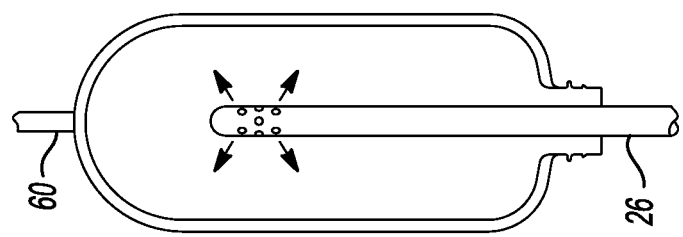
FIG. 2C is a schematic depiction of the system illustrated in FIG. 1 wherein pressurized fluid is further introduced within the preform, which the position of the blow nozzle and stretch rod assembly remains stationary.
Figure 2B:
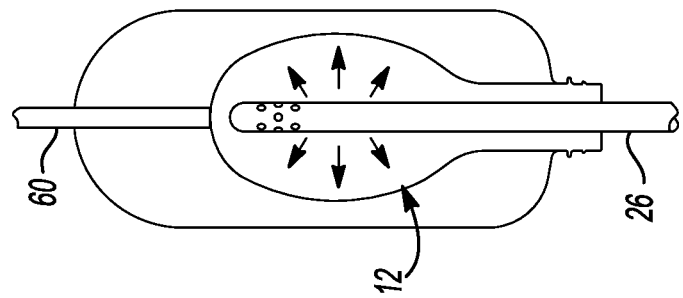
FIG. 2B is a schematic depiction of the system illustrated in FIG. 1 wherein a blow nozzle and stretch rod assembly extends into the preform to initiate mechanical stretching and wherein pressurized fluid is introduced within the preform thereby expanding the preform toward the walls of the mold cavity.
Figure 2A:
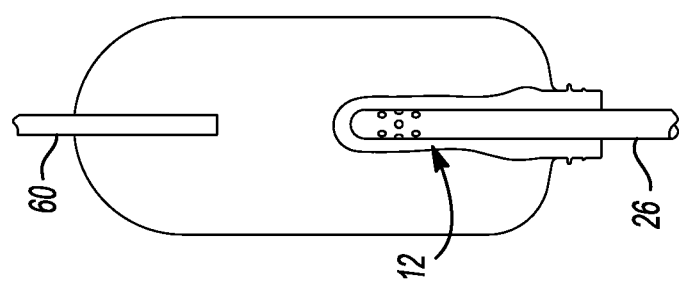
FIG. 2A is a schematic depiction of the system illustrated in FIG. 1 wherein the mold halves close around the preform.

Turning now to FIG. 2A, the stretch rod 26 may extend into the preform 12 to initiate mechanical stretching, thereby thinning the sidewalls of the preform 12. Pressurized fluid from pressure source 20 can be introduced into preform 12 through the opening of fluid supply valve 32 and the flow of pressurized fluid from outlet 30 into inlet 34 of blow nozzle 22. The pressurized fluid enters preform 12 via the ports 36 or blow nozzle 22. In one example, the hydraulic or pneumatic pressure within the preform 12 may reach between approximately 100 PSI to 600 PSI. The pressurized fluid causes the preform 12 to expand toward the interior surface 34 of the mold cavity 16. Residual air may be vented through a passage defined in the blow nozzle 22. As shown in FIG. 2B, during this time, counter stretch rod 60 can be extended to engage and position preform 12 (also known as pre-shape at this stage).

In some embodiments, pressurized fluid can be provided at a constant pressure or at different pressures during the molding cycle. For example, during axial stretching of the preform 12, pressurized fluid may be provided at a pressure which is less than the pressure applied when the preform 12 is blown into substantial conformity with the interior surface 34 of the mold cavity 16 defining the final configuration of the plastic container. This lower pressure $P_1$ may be ambient or greater than ambient but less than the subsequent high pressure $P_2$. The preform 12 is axially stretched in the mold cavity 16 to a length approximating the length of the mold 16. During or just after stretching the preform 12, the preform 12 is generally expanded radially outward under the low pressure $P_1$. This low pressure $P_1$ is preferably in the range of between approximately 50 PSI to 200 PSI and can be held for a predetermined amount of time, such as 0.1 to 0.2 seconds. Subsequently, the preform 12 is further expanded under the high pressure $P_2$ such that the preform 12 contacts the interior surface 34 of the mold halves thereby forming the primary article. In some embodiments, hot air can be recirculated within the primary article to modify the crystalline structure of the primary article and/or facilitate manufacturing (see FIG. 2C).

At this stage, as shown in FIG. 2D, the internal pressure of the primary article can be released either to atmosphere or into an air recovery system. This release of internal pressure results in the hot pre-shape or primary article shrinking away from the walls of the mold 16. At this same time or after a predetermined time, a vacuum can be introduced within the pre-shape or primary article to aid in the evacuation of internal air. The counter stretch rod 60 can engage the preform or primary article to maintain gate center and to aid in the reduction of the overall height. Vacuum can be introduced through the actuation of vacuum supply valve 56 into the opened position, thereby fluidly connecting the internal volume of the pre-shape or primary article to the vacuum source 50 via blow nozzle 22, port 36, inlet 34 and line 54.

In some embodiments, pressurized hot air can be reintroduced into the final article to aid in the relaxation and to develop further crystallinity in the material. This pressurized hot air can also aid in the container definition, more specifically by creating a blown finish where standard pressurized air has an insufficient temperature to soften the material enough to form the threads to their specified dimension.

This process results in the quick, simple, and efficient blow molding production of a container. The use of a vacuum source further provides efficiencies in that it reduces the time necessary to shrink or otherwise resize the primary article to the final shape.

In some embodiments, the present teachings can be used to create a high level of heat-induced, spherulitic crystallinity in the finish while providing a high level of orientation and thermal relaxation in the body of the final container.

Figure 4D:
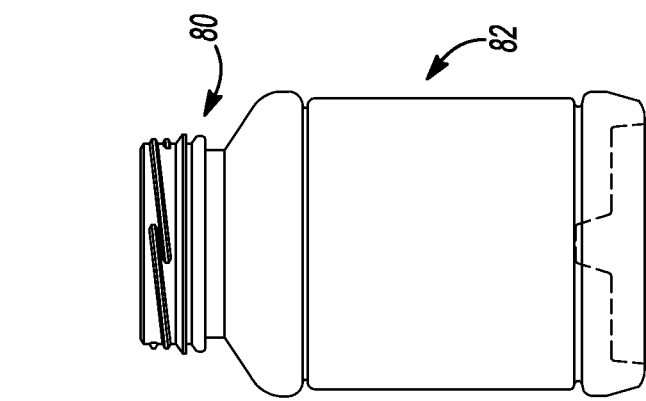
FIGS. 4A-4D is a series of articles according to the present teachings including a preform (FIG. 4A), a Primary Article (FIG. 4B), an Intermediate Article (FIG. 4C), and a final container (FIG. 4D).
Figure 4C:
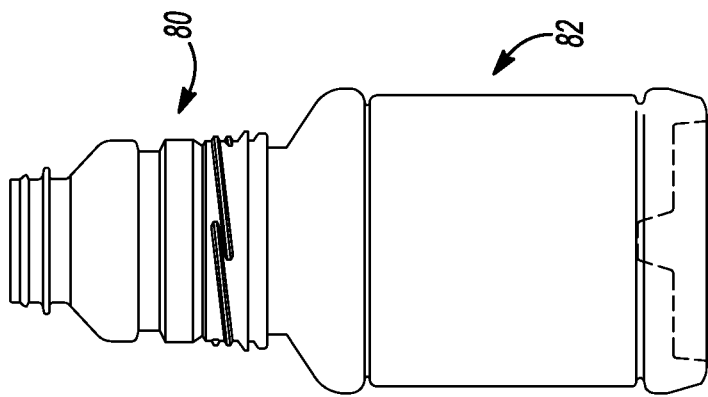

To this end, with particular reference to FIGS. 4A-4D, sequential articles are provided for discussion. Specifically, in FIG. 4A, a preform 12 is provided. The preform 12 includes a finishing forming region 80 and a body forming region 82 disposed below the finish forming region 80. The finish forming region 80 is generally a section of preform 12 that will be formed into the finish of the final container. The body forming region 82 is generally a section of the preform 12 that will be formed into the body of the final container. The preform 12 will be shaped from a preform (FIG. 4A) to a Primary Article (FIG. 4B) to an Intermediate Article (FIG. 4C) to a final container (FIG. 4D).

In some embodiments, the diameter of the finish forming region 80 of the primary article (FIG. 4B) is limited to about 15% to 50% greater than the diameter of finish forming region 80 of preform 12 (FIG. 4A) and more preferably about 20% to 40%. The diameter of the body forming region 82 of primary article (FIG. 4B) is 2 to 3 times greater than the diameter of preform 12 (FIG. 4A) as measured in the body forming region 82 of preform 12. This results in a primary article (FIG. 4B) having a diameter ratio of body forming region 82 of primary article (FIG. 4B) to finish forming region 80 of primary article (FIG. 4B) is in the range of 1.3:1 to 2.5:1.

This results in a primary article (FIG. 4B) wherein the finish forming region 80 is thicker and less oriented than the body forming region 82. Due to this, the finish forming region 80 retains more heat and contains more amorphous material than does the body forming region 82. This will result in higher levels of formation of heat-induced, or spherulitic crystallinity, in the finish forming region 80 of the primary article (FIG. 4B) during the reconditioning stage given the retained heat and higher level of amorphous material available to support formation of spherulitic crystals.

Given the fact that the diameter of the body forming region 82 of primary article (FIG. 4B) is at least 2 to 3 times greater than the corresponding preform 12 diameter, this results in a thinner wall and higher levels of orientation and stretch-induced crystallinity in this region, particularly as compared to that of the finish forming region 80 as described above. Therefore, this body forming region 82 can shrink back becoming thermally relaxed during the reconditioning stage, but will not result in high levels of spherulitic crystal formation as occurs in the finish forming region 80. This is due to the fact that there is not the level of retained heat and amorphous material available in the body forming region 82 to support high levels of spherulitic crystallization during reconditioning.

The above factors will enable formation of a final container with a finish having high levels of heat-induced spherulitic crystallinity, which is preferred for maintaining seal integrity and limiting finish shrinkage during subsequent filling and/or heat processing. Conversely, the body portion of the final container (FIG. 4D) will have high levels of orientation and stretch-induced crystallinity with low levels of residual stresses as a result of the double-blow process.

Figure 4B:
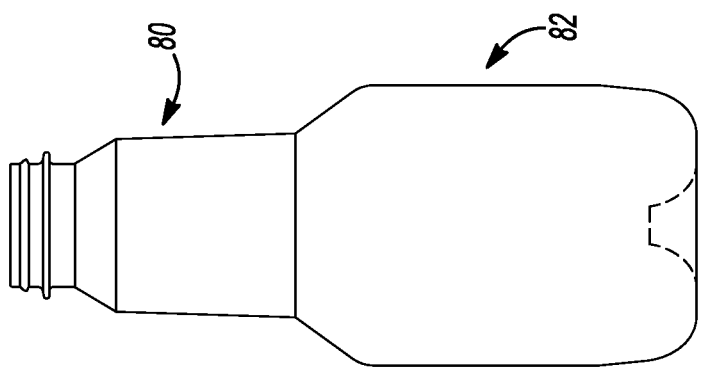
Figure 4A:
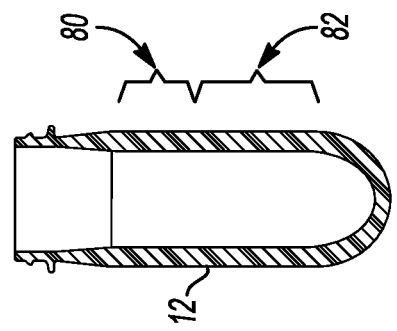

The present teachings provide a number of advantages, such as the average wall thickness and diameter of the preform 12 (FIG. 4A) is fairly consistent along its vertical extent in both the finish forming region 80 and body forming region 82. Moreover, the diameter of the finish of final container (FIG. 4D) ranges from about 10% to 30% greater than the diameter of the finish forming region 80 of the primary article (FIG. 4B). The diameter of the body forming region 82 of the primary article (FIG. 4B) is 2 to 3.5 times greater than diameter of preform (FIG. 4A) as measured in the body forming region 82 of preform 12. This results in a primary article (FIG. 4A) having a diameter ratio of body of primary article (FIG. 4B) to neck portion of primary article (FIG. 4B) is in the range of 1.3:1 to 2.5:1. In some embodiments, the diameter of the finish forming region 80 of primary article (FIG. 4B) is limited to about 15% to 50% greater than the diameter of finish forming region of preform (FIG. 4A) and more preferably 20% to 40%. In some embodiments, the finish diameter of the final container (FIG. 4D) is between 10% less than and 10% greater than finish forming region 80 of the primary article (FIG. 4B). In some embodiments, the finish of the final container (FIG. 4D) will have a higher level of heat-induced, spherulitic crystallinity than that of the sidewall of the final container. In some embodiments, the sidewall of final container (FIG. 4D) will have higher levels of orientation & stretch-induced crystallinity than exists in the finish. It is anticipated that in some embodiment the overall crystallinity and/or density will be greater in the finish region of final container (FIG. 4D) than that of the container body and base regions.

While much of the description has focused on the production of PET containers, it is contemplated that other polyolefin materials (e.g., polyethylene, polypropylene, etc.) as well as a number of other plastics may be processed using the teachings discussed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a blow molded container comprising:
   a. disposing a preform into a primary mold cavity;
   b. applying pressurized air to urge the preform to conform to the shape of the primary mold cavity to form a primary article;
   c. permitting the primary article to shrink to a predetermined volume;
   d. disposing the primary article into a second mold cavity;
   e. applying pressurized air to urge the primary article to conform to the second mold cavity to form an intermediate article; and
   f. trimming off at least a portion of the intermediate article to form a final container;
   wherein the permitting the primary article to shrink to the predetermined volume is induced through application of a vacuum.

2. The method according to claim 1 wherein the applying pressurized air to urge the preform to conform to the shape of the primary mold cavity to form the primary article comprises applying pressurized air at a first pressure to urge the preform to conform to the shape of the primary mold cavity to form the primary article; and
   wherein the applying pressurized air to urge the primary article to conform to the second mold cavity to form the intermediate article comprises applying pressurized air at a second pressure to urge the primary article to conform to the second mold cavity to form an intermediate article; the first pressure being different from than the second pressure.

3. The method according to claim 2 wherein the first pressure is less than the second pressure.

4. The method according to claim 3, further comprising: mechanically stretching the preform prior to the applying pressurized air at the first pressure.

5. The method according to claim 1 wherein the applying pressurized air to urge the preform to conform to the shape of the primary mold cavity to form the primary article comprises applying pressurized air to urge the preform to conform to the shape of the primary mold cavity to form the primary article using pressurized air in a range of 50 to 250 psi.

6. The method according to claim 1 wherein the disposing the preform into the primary mold cavity comprises disposing the preform into the primary mold cavity where the primary mold cavity is within a temperature range of 200° F. to 400° F.

7. The method according to claim 1 wherein the disposing the preform into the primary mold cavity comprises disposing the preform into the primary mold cavity where the primary mold cavity is within a temperature range of 300° F. to 350° F.

8. The method according to claim 1 wherein the permitting the primary article to shrink to the predetermined volume occurs while the primary article is disposed within the primary mold cavity.

9. The method according to claim 1 wherein the vacuum is formed through use of a vacuum generator.

10. The method according to claim 1 wherein the applying pressurized air to urge the primary article to conform to the second mold cavity to form the intermediate article comprises applying pressurized air to urge the primary article to conform to the second mold cavity to form the intermediate article using pressurized air in a range of 400 to 700 psi.

11. The method according to claim 1 wherein the applying pressurized air to urge the preform to conform to the shape of the primary mold cavity to form the primary article comprises applying pressurized air to urge the preform to conform to the shape of the primary mold cavity to form the primary article such that a diameter of a finish forming region of the primary article is between 15% and 50% larger than a diameter of a finish forming region of the preform.

12. The method according to claim 1 wherein the applying pressurized air to urge the preform to conform to the shape of the primary mold cavity to form the primary article comprises applying pressurized air to urge the preform to conform to the shape of the primary mold cavity to form the primary article such that a diameter of a finish forming region of the primary article is between 20% and 40% larger than a diameter of a finish forming region of the preform.

13. The method according to claim 1 wherein the applying pressurized air to urge the preform to conform to the shape of the primary mold cavity to form the primary article comprises applying pressurized air to urge the preform to conform to the shape of the primary mold cavity to form the primary article such that a diameter of a body forming region of the primary article is between 200% and 300% larger than a diameter of a body forming region of the preform.

14. The method according to claim 1 wherein the applying pressurized air to urge the preform to conform to the shape of the primary mold cavity to form the primary article comprises applying pressurized air to urge the preform to conform to the shape of the primary mold cavity to form the primary article such that a ratio of a body forming region of the primary article to a finish forming region of the primary article is between 1.3:1 to 2.5:1.

15. The method according to claim 1 wherein the applying pressurized air to urge the primary article to conform to the second mold cavity to form the intermediate article comprises applying pressurized air to urge the primary article to conform to the second mold cavity to form the intermediate article such that a finish region of the intermediate article includes more spherulitic crystallinity compared to a body region of the intermediate article.

16. The method according to claim 1 wherein a finish region of the final container comprises higher levels of spherulitic crystallization than a body region of the final container.

17. The method according to claim 1 wherein a body region of the final container comprises higher levels of molecular orientation than a finish region of the final container.

18. The method according to claim 1 wherein a body region of the final container comprises less residual molecular stresses than a finish region of the final container.

19. A method of forming a container, the method comprising:
   providing a preform;
   disposing the preform in a mold cavity;
   applying a first fluid pressure within the preform thereby urging the preform outwardly to generally conform to the mold cavity; and
   applying a vacuum pressure within the preform after the applying the first fluid pressure thereby urging the preform inwardly;
   wherein the applying the first fluid pressure within the preform comprises applying the first fluid pressure within the preform thereby urging a finish forming region of the preform outwardly to a diameter between 15% and 50% larger than a diameter of a finish, forming region of the preform.

20. The method according to claim 19, further comprising:
   applying a second fluid pressure within the preform after the applying the vacuum pressure.

21. The method according to claim 20 wherein the first fluid pressure is different than the second fluid pressure.

22. The method according to claim 19 wherein the applying a first fluid pressure and the applying a vacuum pressure are both performed through a single nozzle disposed within the preform.

23. The method according to claim 22, further comprising:
   mechanically stretching the preform using the single nozzle prior to the applying a first fluid pressure.

24. The method according to claim 19 wherein the applying a first fluid pressure and the applying a vacuum pressure are both performed through stretch rod openings disposed within the preform.

25. The method according to claim 24, further comprising:
   mechanically stretching the preform using the stretch rod prior to the applying a first fluid pressure.

26. The method according to claim 19, further comprising:
   heating the mold cavity at least prior to or during the applying the first fluid pressure.

27. The method according to claim 26 wherein the mold cavity is heated to a temperature between approximately 200° F. (93° C.) and 400° F. (177° C.).

28. The method according to claim 26 wherein the mold cavity is at temperature between approximately 32° F. (0° C.) to 260° F. (127° C.).

29. The method according to claim 19 wherein the first fluid pressure is a pressure between approximately 50 PSI and 600 PSI.

30. The method according to claim 19, further comprising:
   mechanically stretching the preform prior to the applying a first fluid pressure.

31. The method according to claim 19 wherein the applying the first fluid pressure within the preform comprises applying the first fluid pressure within the preform thereby urging a body forming region of the preform outwardly to a diameter between 200% and 300% larger than a diameter of a body forming region of the preform.

32. The method according to claim 19 wherein the applying the first fluid pressure within the preform comprises applying the first fluid pressure within the preform thereby urging the preform outwardly such that a ratio of a body forming region to a finish forming region is between 1.3:1 to 2.5:1.

33. The method according to claim 20 wherein the applying the second fluid pressure within the preform after the applying the vacuum pressure comprises applying the second fluid pressure within the preform after the applying the vacuum pressure such that a finish region includes more spherulitic crystallinity compared to a body region.

34. A method of manufacturing a blow molded container comprising:
   a. disposing a preform into a primary mold cavity;
   b. applying pressurized air to urge the preform to conform to the shape of the primary mold cavity to form a primary article;
   c. permitting the primary article to shrink to a predetermined volume;
   d. disposing the primary article into a second mold cavity;
   e. applying pressurized air to urge the primary article to conform to the second mold cavity to form an intermediate article; and
   f. trimming off at least a portion of the intermediate article to form a final container;
   wherein the permitting the primary article to shrink to the predetermined volume is induced by upward force provided by an external counter-stretching rod.

35. A method of forming a container, the method comprising:
   providing a preform;
   disposing the preform in a mold cavity;
   applying a first fluid pressure within the preform thereby urging the preform outwardly to generally conform to the mold cavity; and
   applying a vacuum pressure within the preform after the applying the first fluid pressure thereby urging the preform inwardly;
   wherein the applying the first fluid pressure within the preform comprises applying the first fluid pressure within the preform thereby urging a finish forming region of the preform outwardly to a diameter between 20% and 40% larger than a diameter of a finish forming region of the preform.

* * * * *